United States Patent [19]

Miller et al.

[11] Patent Number: 4,736,916
[45] Date of Patent: Apr. 12, 1988

[54] PAN UNIT

[76] Inventors: Timothy R. Miller; Robert E. Miller, both of 2 Wharf Road, Vaucluse, New South Wales 2030, Australia

[21] Appl. No.: 898,029

[22] Filed: Aug. 19, 1986

[30] Foreign Application Priority Data

Aug. 19, 1985 [AU] Australia .................. PH2019

[51] Int. Cl.$^4$ ............................................ F16M 11/12
[52] U.S. Cl. .................................. 248/186; 188/290; 248/289.1
[58] Field of Search ............ 248/176, 177, 178, 183, 248/186, 187, 289.1, 278, 276; 188/290; 192/58 B, 58 C

[56] References Cited

U.S. PATENT DOCUMENTS

| 3,123,330 | 3/1964 | Forbes-Robinson | 248/183 |
| 3,877,552 | 4/1975 | Higginson et al. | 248/183 X |
| 3,958,787 | 5/1976 | Miller et al. | 248/183 |
| 4,010,923 | 3/1977 | Miller et al. | 248/183 |
| 4,044,982 | 8/1977 | Miller et al. | 248/183 |
| 4,083,524 | 4/1978 | O'Connor | 248/183 |
| 4,177,884 | 12/1979 | Vinten | 188/290 |

FOREIGN PATENT DOCUMENTS 531761 8/1979 Australia .

Primary Examiner—J. Franklin Foss
Assistant Examiner—David L. Talbott
Attorney, Agent, or Firm—Ladas & Parry

[57] ABSTRACT

In a pan unit for a fluid tripod head, the pan unit includes a cylinder upon which a camera or other piece of equipment is to be mounted, and a piston slidably received within said cylinder. The piston is to be mounted on said tripod head, said piston and cylinder co-operating to provide a first working space within which a viscous liquid is to be located to damp relative movement between said piston and cylinder about the longitudinal axis thereof, the volume of said first working space being variable in order to adjust the viscous drag between said piston and cylinder.

9 Claims, 2 Drawing Sheets

PAN UNIT

The present invention relates to a pan unit suitable for use on a fluid tripod head or similar and, in particular, to a pan unit which employs a piston and cylinder combination to both support the weight of equipment mounted upon it and to dynamically control the panning movement of said equipment.

The present invention further relates to a pan unit which incorporates an integral braking unit which is operated independently of the pan unit fluid control unit.

Pan units suitable for the support of camera equipment and equivalent are known. Also, damping means to provide a controlled and variable resistance torque to the panning or tilting movement are known. Also known are braking mechanisms for use in combination with the damping means.

For example, U.S. Pat. No. 4,010,923 to Miller et al discloses a panning device which provides a variable resistance torque to the panning movement. Essentially, this specification discloses a tapered block which is rotatable in a tapered bore with a hydraulic fluid located between the corresponding tapered surfaces of the block and casing. Mechanical means are also provided to permit axial movement of the block with respect to the casing, thereby allowing the distance between the corresponding tapered surfaces to be varied. This device provides a variable resistance torque, the variability being provided by mechanical means acting to vary the gap between the tapered surfaces. Further, the weight of any apparatus mounted on the top of this pan unit is carried by purely mechanical means involving the direct contact of relatively moving mechanical surfaces one against the other.

This same specification discloses a braking system involving hydraulically operated pistons operating from within a block rotatable within an outer casing, the pistons acting radially against the inside surfaces of said casing. This braking system forms part of a tilt mechanism and forms no part of the pan mechanism. In the disclosure there is no braking system operating independently of the variable pan torque system which provides a means to positively lock the pan unit. U.S. Pat. No. 4,044,982 is specifically concerned with such a brake mechanism.

Australian Pat. No. 531,761 discloses a controllable pivot suitable for either pan or tilt movement of a camera support and incorporating two separate braking mechanisms, the first being a drag brake similar in operation to that described in the above two referenced U.S. Patents and a pivot locking facility independent of the drag brake. The locking brake is a floating band brake operating in the oil of the hydraulic drag brake and, further, is held in a clamped position by means of two mutually opposed threaded screws, both acting on flanges attached to either side of a gap in the locking ring.

The prior art therefore suffered from a number of problems which included:

The function of mechanical support of apparatus mounted on the pan unit is carried out by means of metallic surfaces bearing one upon the other. This can give rise to wear of components which over a period of time results in varied and non-optimal performace of the unit.

The function of bearing support and the function of motion damping has been performed by two separate means. This leads to a relatively complicated device.

A locking brake band could not be incorporated in the pan block assembly which utilised the tapered block arrangement because a simple way could not be found to incorporate a floating brake caliper which would suitably engage against a tapered surface.

Known brake clamping devices used in association with variable resistance torque pan devices have thus far had a tendency to impart a small amount of pan torque at the moment of engagement or disengagement. This is not a desirable characteristic as it may upset the alignment of a camera or similar which has been set in position prior to the locking function being carried out.

Accordingly, it is an object of the present invention to provide an improved pan unit which will substantially overcome or ameliorate the abovementioned disadvantages.

In particular, it is an object of the preferred form of the present invention to provide a pan unit which incorporates the function of bearing support and the function of motion damping by the one means, the said means allowing for hydraulic rather than purely mechanical support of the load which is born by the pan unit.

It is a further object of the preferred form of the present invention, in a further preferred form, to provide such a pan unit which also incorporates a floating band brake which permits clamping of the pan unit independent of the motion damping means and in such a way that alignment of any apparatus mounted thereupon is not upset by such braking or clamping function.

According to the present invention, there is provided a mounting to movably support an apparatus, said mounting including: a base; a mounting member supported on the said base and adapted to receive said apparatus; bearing means interposed between said base and said mounting member and adapted to enable relative rotation between said base and member about a predetermined axis, said bearing means comprising an enclosed working space which separates said base and mounting member, which space receives a liquid to apply a viscous drag force to said base and member; and an adjustment means to vary the volume of said working space and thereby adjust the degree of resistance to said relative movement by adjusting the magnitude of said drag force.

According to a preferred embodiment of the invention there is provided, in combination with the above, a free floating band brake means, said means supported by a dowelled pin against rotational movement at one point on the perimeter of said means, said band brake means being split at a point radially opposite said dowelled pin, said band brake means being adapted to be clamped by mutually opposing means located on and acting upon either side of said point of split, said band break means adapted to operate about the same vertical axis as said base and mounting member and further adapted to prevent, in a clamped condition, relative movement between said base and said mounting member.

One embodiment of the present invention will now be described with reference to the drawings in which.

Figure 1:
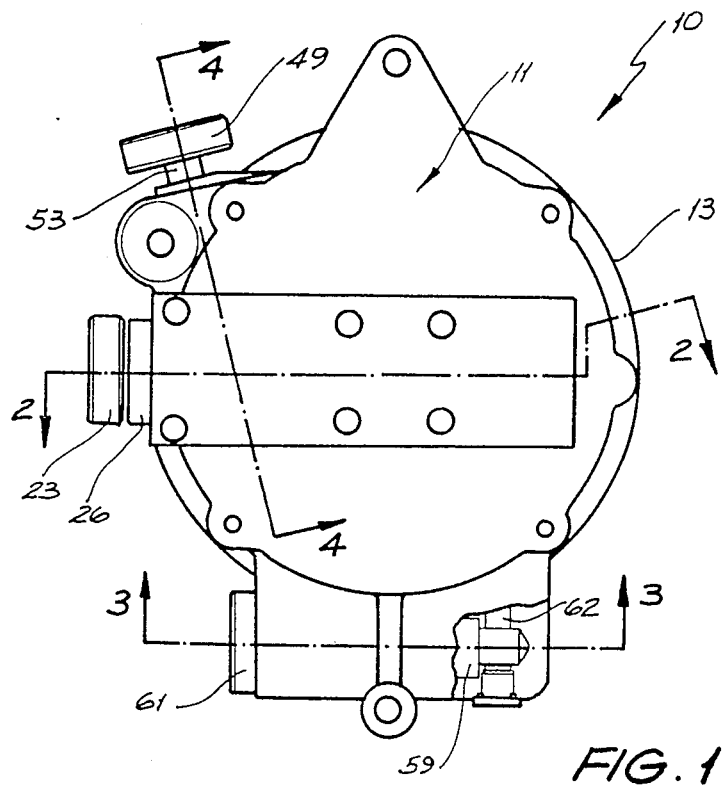
FIG. 1 is a plan view of a pan unit.
Figure 2:
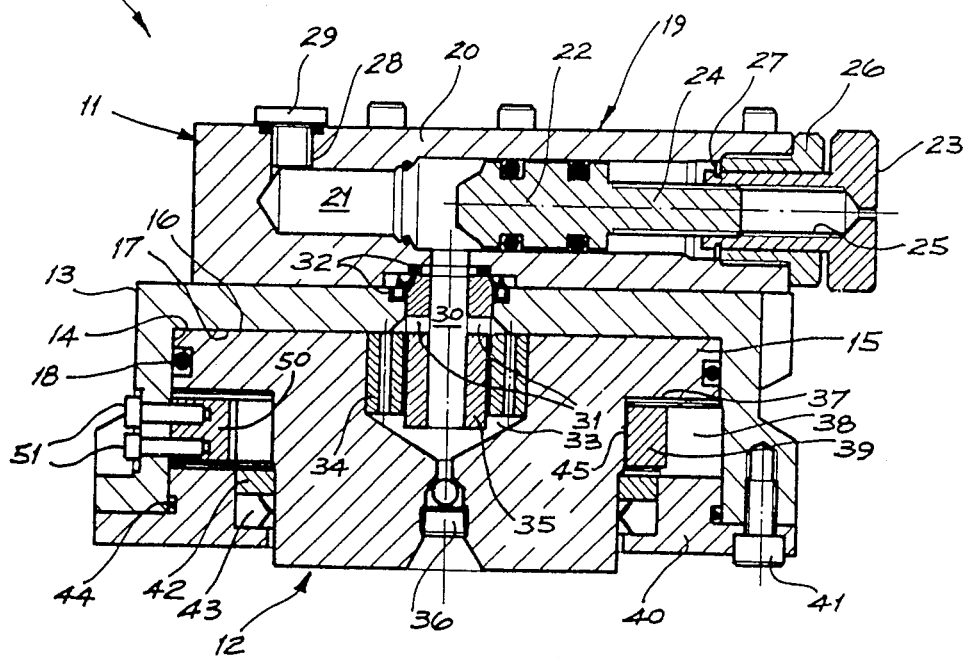
FIG. 2 is a side elevation of the pan unit of FIG. 1 sectioned along the line 2—2.

In the accompanying drawings there is schematically depicted a pan unit 10 for a camera or other instrument, which pan unit permits the operator to select a resistance to the panning motion of the camera or instrument.

The pan unit 10 has a mounting member 11 which supports the camera or additional tilting support. Supporting the member 11 is a base 12 which in turn is supported on a tripod or other suitable support. The support member 11 has a cylindrical portion 13 providing an internal cylindrical surface 14. The surface 14 co-operates with a floating piston 15, forming part of the base 12, to provide a first working space generally located between the planar face 16 of the cylindrical portion 13, and the planar face 17 forming the end face of the piston 15. The piston 15 sealingly engages the surface 14 by means of an "O"-ring seal 18.

The support member 11 also includes an adjustment assembly 19 consisting of a body 20 having a cylindrical passage 21. Received within the passage 21 is a piston 22 which is movable longitudinally of the passage 21 by operation of the adjustment knob 23. Extending from the piston 22 is a piston rod 24 which is threaded and threadably engages an internal passage 25 of the adjustment knob 23. The adjustment knob 23 in turn is rotatably slidably supported by a sleeve 26. Additionally the adjustment knob 23 is provided with a retaining clip 27 to captively locate the knob 23 with respect to the body 20.

One end of the passage 21 is provided with a filling passage 28, closed by a bolt 29, which may also act as a bleed passage. The passage 21 and piston 22 co-operate to define a second working space which is in fluid communication with the first working space defined between the faces 16 and 17. More particularly these two working spaces communicate via a passage 30 and smaller radial passages 31.

Seals 32 are also provided to sealingly connect the body 20 with the cylindrical portion 13.

The piston 15 has a central cavity 33 which receives a needle roller bearing 34, which holds the piston 15 concentric with the cylindrical surface 14. More particularly the needle roller bearing 34 engages a spiggot 35 which bears against the cylindrical portion 13.

The cavity 33 is closed at its lower end by means of a plug assembly 36, while it should be appreciated that the fluid existing in the above two described working spaces is also received within the needle roller bearing 34.

Figure 5:
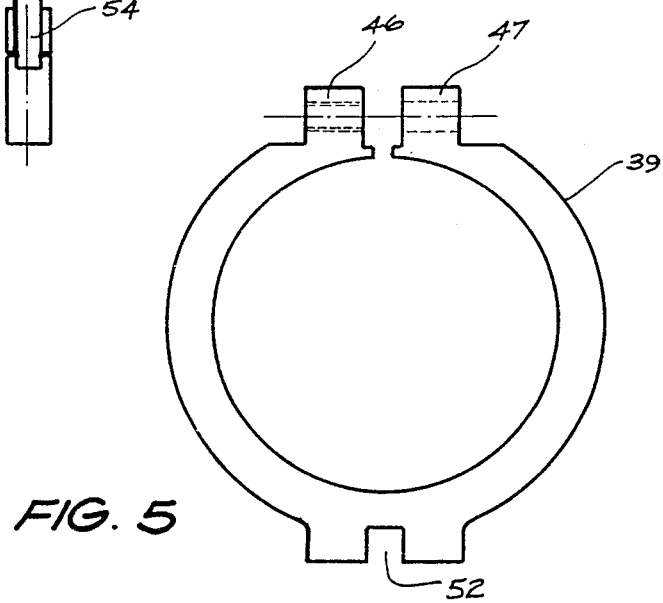
FIG. 5 is a plan view of a floating brake band used in the pan unit of FIG. 1.

The piston 15 is provided with an annular face 37 which partly defines a chamber 38 to receive a brake band 39. The brake band 39 is more fully depicted in FIG. 5. The chamber 38 is closed by means of an end cap 40 fixed to the cylindrical portion 13 by means of bolts 41. The end cap 40 receives a bearing ring 42 which aids in locating the piston 15 relative to the end cap 40, and a seal 43. A seal 44 is provided between the end cap 40 and the cylindrical surface 14.

Figure 4:
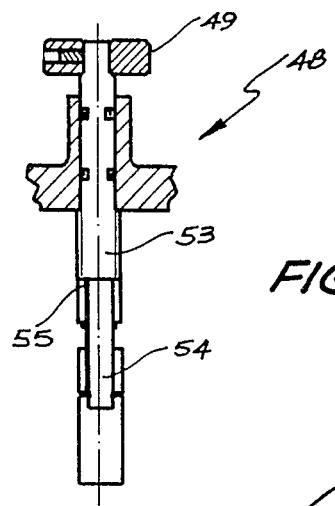
FIG. 4 is a side elevation of the pan unit of FIG. 1 sectioned along the line 4—4.

The brake band 39 is of generally cylindrical configuration and engages a cylindrical surface 45 of the base 12. The band 39 has two eyelets 46 and 47 which receive and co-operate with the adjustment assembly 48 of FIG. 4. The adjustment assembly 48 includes an adjustment knob 49 which adjusts the braking force applied to the cylindrical surface 45 by the band 39. The band 39 is held stationary relative to the cylindrical portion 13 by means of a key secured to the cylindrical portion 13 by bolts 51. The key 50 is received within a slot 52 formed in the band 39.

The adjustment assembly 48 includes a shaft 53, fixed to the knob 49, having a threaded end 54 engaged with the eyelet 46. The shaft 53 only slidably passes through the eyelet 47 but abuts the eyelet 47 by means of a step 55. Upon rotation of the shaft 53, the two eyelets 46, 47 can be moved relative to each other. Preferably the brake band 39 would be formed of resilient material so that the brake band 39 is resiliently biased away from the cylindrical surface 45. As an alternative, a spring may be located between the eyelets 46 and 47 to bias them apart.

Figure 3:
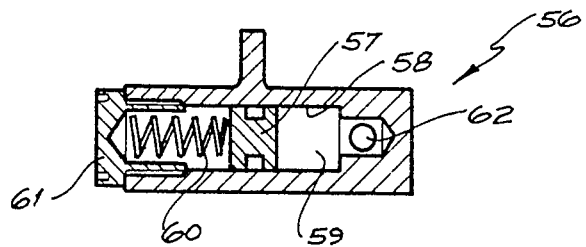
FIG. 3 is a side elevation of the pan unit of FIG. 1 sectioned along the line 3—3.

Communicating with the chamber 38 is an equaliser assembly 56 (FIG. 3), which equaliser assembly includes a piston 57 slidingly co-operating with an internal cylindrical surface 58. The piston 57 is biased to minimise the volume of the chamber 59 via a spring 60 bearing against an end cap 61. The chamber 59 communicates with the chamber 38 by means of a passage 62.

It should be appreciated that the above described first working space located between the faces 16 and 17, receive a high viscosity silicone oil, preferably having a viscosity of about 400,000 to 700,000 centi stokes. It is still further preferred that this high viscosity oil is relatively stable in respect of its viscosity over the temperatures to which the pan unit 10 would be subjected. It is also preferred that the chamber 38 receive a low viscosity light grade lubricating oil which does not freeze up in low temperature conditions.

In operation of the above described pan unit 10 the viscous drag between the two surfaces 16 and 17 can be adjusted by the film thickness of the viscous liquid located therebetween. The film thickness is adjusted by longitudinal movement of the piston 22 in the passage 21. By moving the piston 22, the volume of the second working spaces changes, which in turn changes the volume of the first working space. Accordingly this will cause relative movement between the faces 16 and 17, relative to the cylindrical portion. This movement of the cylindrical portion will change the volume of the chamber 38. This change in volume is accommodated by the equaliser assembly 56 which forces further lubricating oil into the chamber 38. It should further be appreciated that the viscous drag system of this pan unit 10 also provides the main thrust of the support for the mounting member 11 and therefore the camera mounted thereon.

The faces 16 and 17 have sufficient diameter to provide the mounting member 11 with the stability required. However the liquid film located therebetween must be sufficiently thin to inhibit tilting of the axis of the cylindrical surface 14 relative to the axis of the piston 15. Accordingly the range of movement between the mounting member and piston 15 is preferably in the range of about 0 to 0.040 inches.

It may also be advantageous to provide a bearing washer between the faces 16 and 17.

Since the viscous drag force is inversely proportioned to the distance between the surfaces 16 and 17, the greater the film thickness, the less resistance there is to movement between the surface 16 and 17, at any given relative velocity.

The foregoing describes only one embodiment of the invention and modifications, obvious to those skilled in the art, can be made thereto without departing from the scope of the present invention. For example, whilst the present invention has been described with particular reference to camera and photographic equipment, the same invention is also suitable for use in supporting and controlling the movement of telescopes, electronic aligning devices and video cameras.

It is an advantage of the above described preferred form of the present invention that a pan unit is provided which will support a large range of camera or similar apparatus weights and, by means of simple manual hydraulic adjustment, can be made to vary its resistance to panning motion.

What we claim is:

1. A mounting to movably support an apparatus, said mounting including:
   a base;
   a mounting member supported on said base and adapted to receive said apparatus;
   bearing means interposed between said base and said mounting member so that said mounting member is supported thereby, which bearing means are adapted to enable relative rotation between said base and member about a vertical axis, said bearing means comprising a first bearing surface fixed to said base, a second bearing surface fixed to said mounting member, an enclosed working space which separates said first surface and said second surface, which space receives a liquid so that said second surface is supported by said first surface and so as to apply a viscous drag force to said first surface and said second surface upon relative movement therebetween about said axis; and
   adjustment means to alter the distance between the surfaces to vary the volume of said working space and thereby adjusts the degree of resistance to said relative movement by adjusting the magnitude of said drag force.

2. The mounting of claim 1 wherein said working space is enclosed by a cylindrical surface within which there is slidingly sealingly received a piston enabling the volume of said space to be varied by movement of the piston, and said adjustment means includes a further working space connected to the first-mentioned working space by means of a passage to enable the transfer of liquid therebetween, with the volume of said second working space being adjustable to vary the volume of said first-mentioned working space.

3. The mounting of claim 2 wherein said second working space is enclosed by a cylindrical passage within which there is slidably received a piston to vary the volume of said second working space.

4. The mounting of claim 3 including a piston rod extending from the piston of said second working space, which piston rod extends outwardly of said body, said piston rod having a threaded extremity engaged by a threaded adjustment member which upon rotation causes movement of said piston rod and therefore said piston to vary the volume of said second working space.

5. The mounting of claim 2 further including a shaft extending from the piston of said first space, and said bearing means includes a bearing supporting said shaft on said base and maintaining said shaft generally coaxial with respect to said axis.

6. The mounting of claim 2 wherein said piston is movable along said axis to vary the volume of the first-mentioned working space.

7. The mounting of claim 2 further including a chamber at least partly defined by the piston of said first-mentioned working space but sealingly separated therefrom by the piston of said first-mentioned working space, said chamber being enclosed so as to receive a lubricating liquid, brake means located within said chamber and operatively associated with the piston and cylinder of said first-mentioned space to brake any relative movement therebetween.

8. The mounting of claim 7 further including an equaliser chamber to receive liquid from said chamber upon movement of the piston of said first-mentioned space.

9. The mounting of claim 8 wherein said brake includes a cylindrical surface formed on the piston of said first-mentioned passage, which cylindrical surface is coaxial with respect to said axis, and a brake band located within said chamber and adapted to frictionally engage said cylindrical surface, and means to retain said brake band stationary relative to the cylinder of said first-mentioned working space.

* * * * *